(12) United States Patent
Salfelner

(10) Patent No.: US 7,236,752 B2
(45) Date of Patent: Jun. 26, 2007

(54) CIRCUIT ARRANGEMENT FOR INCREASING A SUPPLY VOLTAGE

(75) Inventor: Anton Salfelner, Pernegg (AT)

(73) Assignee: Infineon Technologies AG, Munich (DE)

( * ) Notice: Subject to any disclaimer, the term of this patent is extended or adjusted under 35 U.S.C. 154(b) by 350 days.

(21) Appl. No.: 10/896,775

(22) Filed: Jul. 21, 2004

(65) Prior Publication Data

US 2005/0054387 A1    Mar. 10, 2005

(30) Foreign Application Priority Data

Jul. 22, 2003   (DE) ............................... 103 33 278

(51) Int. Cl.
  *H01Q 11/12*   (2006.01)
  *H04B 1/04*    (2006.01)
(52) U.S. Cl. ..................................... 455/91; 455/127.1
(58) Field of Classification Search ........ 455/571–574, 455/127.1, 127.5, 343.1, 343.2
See application file for complete search history.

(56) References Cited

U.S. PATENT DOCUMENTS

| | | | |
|---|---|---|---|
| 4,673,865 A | 6/1987 | DeLuca et al. | |
| 5,859,567 A * | 1/1999 | Black | 330/279 |
| 6,121,841 A * | 9/2000 | Sakuno | 330/285 |
| 6,127,886 A * | 10/2000 | Khabbaz et al. | 330/51 |
| 6,549,076 B2 * | 4/2003 | Kuriyama | 330/296 |
| 6,678,507 B1 * | 1/2004 | Kurokawa et al. | 455/127.1 |
| 6,947,714 B2 * | 9/2005 | Weiss et al. | 455/127.1 |
| 6,990,323 B2 * | 1/2006 | Prikhodko et al. | 455/126 |

FOREIGN PATENT DOCUMENTS

EP   1 119 906 B1   8/2001

* cited by examiner

*Primary Examiner*—Simon Nguyen
(74) *Attorney, Agent, or Firm*—Eschweiler & Associates, LLC

(57) ABSTRACT

A circuit for increasing a supply voltage comprises a transmitter for transmitting a radio signal, with an amplifying device having a supply input for a first supply potential, and a signal output with an antenna connected thereto. Furthermore, the circuit includes a circuit arrangement with a supply input for a second supply potential that is greater than the first supply potential. A voltage rectification circuit is provided that is connected to the signal output of the amplifying device and to the supply input of the circuit arrangement. As a result, an RF input signal is transformed into a rectified voltage. The amplifying device amplifies the radio signal to such an extent that the sum of the rectified voltage and of a first supply voltage is as great as a second supply voltage.

16 Claims, 2 Drawing Sheets

CIRCUIT ARRANGEMENT FOR INCREASING A SUPPLY VOLTAGE

REFERENCE TO RELATED APPLICATIONS

This application claims the benefit of the priority date of German application DE 103 33 278.2, filed on Jul. 22, 2003, the contents of which are herein incorporated by reference in their entirety.

FIELD OF THE INVENTION

The invention relates to a circuit arrangement for increasing a supply voltage.

BACKGROUND OF THE INVENTION

In sensor systems which measure a particular physical state and then transmit it to a receiver for further processing, different supply voltages may be required for the transmitter or for the sensor. Thus, for example, a transmitter stage in a pressure monitoring system for vehicle tires requires a supply voltage of 2.1 volts. For the associated pressure sensor, however, a supply voltage of 2.5 volts is needed. If the transmitter is fed with a supply voltage of 2.5 volts, this leads to an increased power consumption in the transmitter. It is, therefore, appropriate to select a supply voltage of 2.1 volts for the transmitter and to increase this voltage by an additional circuit in order to ensure that the transmitter will be operable.

Possible constructions for such circuits are low-frequency step-up switch mode power supplies or charge-pumping systems. Such circuits increase the supply voltage to the voltage needed for the sensor, in most cases by charging up a capacitor. The disadvantage of such a circuit is an increased space requirement and higher costs, which stand in the way of the requirement for high integration density and more advantageous mass production.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The invention provides a circuit wherein a supply voltage is increased in a simple manner.

A voltage boost circuit is provided which contains a signal transmitter which has an amplifying device. The amplifying device has a supply input terminal that receives a first supply potential. The amplifying device also has a reference potential input terminal that connects to a reference potential. In addition, the amplifying device includes a signal input terminal and a signal output terminal.

The voltage boost circuit also contains an antenna that is coupled to the signal output terminal of the amplifying device. Furthermore, the circuit according to the invention includes a circuit arrangement having a supply input and a connection for the reference potential, wherein the circuit arrangement is constructed to receive a second supply potential at the supply input thereof that is greater than the first supply potential. Finally, the voltage boost circuit according to the invention contains a voltage rectification circuit that has an input and an output, wherein the input is coupled to the signal output terminal of the amplifying device, and the output of which is coupled to the supply input of the circuit arrangement.

In the voltage boost circuit of the present invention, an RF signal to be transmitted is converted into a rectified voltage at the output of the amplifying device via the voltage rectification circuit and used for supplying the circuit arrangement or a further arrangement. The term "voltage" designates the difference between two potentials, and a "supply voltage" is the difference between the supply potential and a reference potential. Since the circuit arrangement is constructed for being supplied with a second supply potential that is greater than the first supply potential, the second supply voltage needed for operating the arrangement is greater than the first supply voltage when the reference potential is the same as the first supply voltage.

The voltage of an RF signal at the output of the amplifying device is a result of the difference of the potential of the RF signal and the reference potential. Since the voltage amplitudes of the peak RF values can be up to five times the supply voltage of the amplifying device depending on operating mode and adaptation of the amplifying device, a rectified voltage which is distinctly higher than the first supply voltage can be provided at the output of the voltage rectification circuit.

The output of the voltage rectification circuit is coupled to circuit arrangements that need a higher supply voltage. The amplifying device amplifies the radio signal by an adequate extent so that, after rectification by the voltage rectification circuit, the sum of the rectified voltage at the output of the voltage rectification circuit and the first supply voltage is as great as the second supply voltage needed for the arrangement. The supply input of the circuit arrangement is coupled to the output of the voltage rectification circuit and to the first supply voltage so that the sum of rectified voltage and first supply voltage results in the second supply voltage. If the power consumption of an arrangement coupled to the voltage rectification circuit is low, hardly any energy is taken from the actual RF signal and it is only attenuated very little. It is also possible to transmit the radio signal without errors.

It is particularly suitable if the amplifying device of the transmitter is operated in an operating mode in which the voltage rectified by the voltage rectification circuit is at least as large as the second supply voltage needed by an arrangement. As a result, it is possible to connect the supply input of the circuit arrangement directly to the output of the voltage rectification circuit. Such an operating mode is advantageously the Class E or the Class C–E operating mode of an amplifier.

In this context, it is appropriate if the amplifying device is operated in a non-linear operating mode. In such an operating mode, the voltage amplitude of the RF signal at the signal output terminal of the amplifying device assumes distinctly higher values than the supply voltage of the amplifying device. At the output of the voltage rectification circuit, an available voltage is also distinctly greater than the supply voltage.

In one advantageous embodiment of the invention, the amplifying device comprises a bipolar transistor, and the emitter terminal is coupled to the reference potential input terminal, and the collector terminal is coupled to the antenna, and to the first supply potential, and to the input of the voltage rectification circuit. The bipolar transistor has a connection to the first supply voltage. As an alternative, the amplifying device may also comprise an MOS field effect transistor, wherein the source terminal is coupled to the reference potential input terminal, and the drain terminal is coupled to the antenna, and to the first supply potential. Furthermore, the drain terminal is connected to the voltage rectification circuit.

Thus, the signal output of the amplifying device for the radio signal forms, at the same time, the supply input for the supply potential. In addition, the rectified RF potential is advantageously added to the supply potential of the amplifying device in this embodiment. If the reference potential of the RF signal and of the supply are of equal magnitude, the voltages are advantageously added. At the output of the voltage rectification circuit, therefore, the sum of supply voltage and rectified voltage is provided.

An embodiment of the voltage rectification circuit comprises at least one diode and a charge store that is coupled to the output of the voltage rectification circuit and to the reference potential. This charge store smoothes the rectified voltage. The charge store in this arrangement can also be suitably constructed as a rechargeable battery. This provides for a relatively long storage so that a circuit arrangement connected to the output of the voltage rectification circuit can still be operated when there is no transmitting operation in progress.

It is also suitable, in one example, if the antenna and the output of the amplifying device are connected to one another via a matching network. The output power and the efficiency of the amplifying device are advantageously increased by means of the matching network.

Additional space and costs can be saved if the at least one diode of the means for voltage rectification, together with the amplifying device, are constructed on an integrated chip.

In a further development of the invention, the arrangement is constructed as a circuit for generating information, which has an output which is coupled to the signal input of the amplifying device and at which a signal with the information generated can be picked up. The signals themselves can be both analog and digital signals. Thus, in a further development, the arrangement is a sensor for measuring physical characteristics. The measured values are supplied as signals to the signal input of the amplifying device.

The circuit arrangement according to the invention can be used, for example, particularly suitably in an air pressure monitoring system for tires.

BRIEF DESCRIPTION OF THE DRAWINGS

In the text which follows, the invention will be explained in detail by means of exemplary embodiments and with the assistance of drawings, in which.

DETAILED DESCRIPTION OF THE INVENTION

Figure 1:
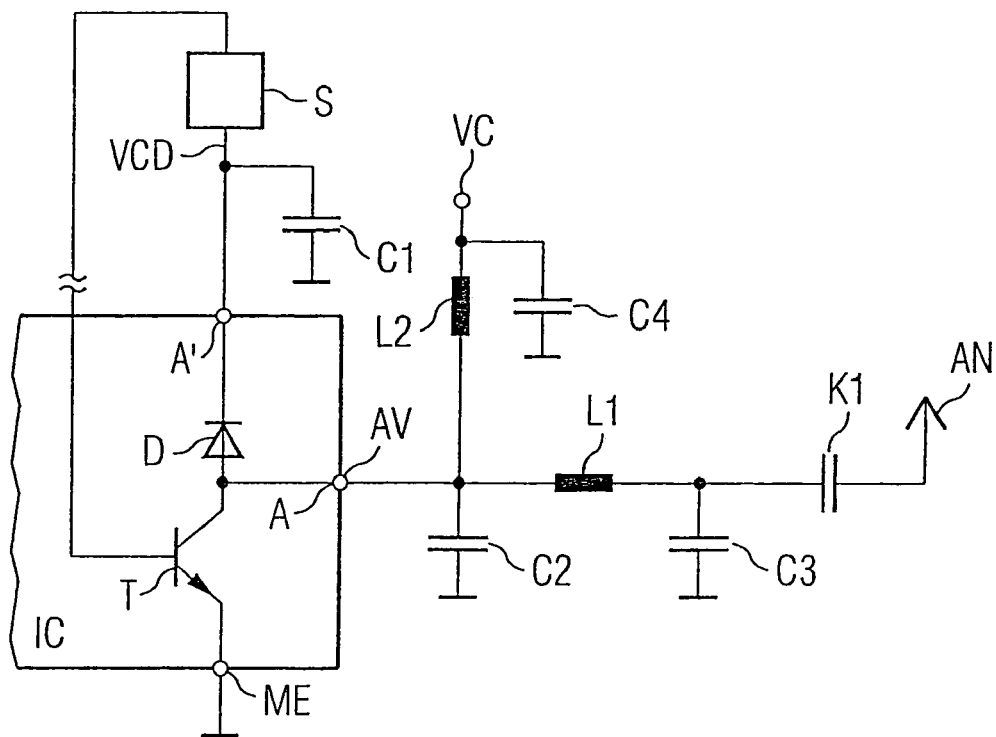
FIG. 1 shows a first exemplary embodiment of the invention.

FIG. 1 shows an integrated chip IC which is part of a transmitter. The chip IC comprises, in one example, an NPN bipolar transistor T and a diode D. The transistor T is the output stage transistor of an amplifying device. The emitter of the NPN transistor T comprises a reference potential input terminal and is connected to a reference potential, to ground in this case. The base of the transistor T forms a signal input terminal that receives the RF input signal. The collector of the transistor T comprises both a supply input terminal and a signal output terminal. The collector connects as the signal output terminal A of the amplifying circuit IC to the anode of the diode D. The cathode of the diode D leads to the output A' of the integrated amplifying device IC. This output A' forms a supply potential connection and supplies a circuit arrangement S with the supply potential necessary for its operation. The supply voltage of the circuit S is the difference between a potential present at the connection and a reference potential which is present at the reference potential connection of the circuit S. Between the circuit S and the output A', a capacitor C1 is connected, the other side of which is connected to ground.

The signal output terminal A of the amplifying circuit is connected to the antenna AN via a coil L1 and a coupling capacitor K1. The capacitors C2 and C3 are connected with one end to the output A and the coil L2 or the coil L1, respectively, and the coupling capacitor K1, and with the other end to the ground potential. The other terminal of the capacitors C2 and C3 in each case is connected to ground.

Furthermore, the collector of the transistor T, which leads to output A, forms the supply input terminal, and is coupled to a supply potential VC via a coil L2. A capacitor C4 is connected to the coil L2 and to ground. The signal output A, therefore, forms at the same time a supply input AV for supplying the transistor T.

The capacitors C2, C3 and the coupling capacitor K1 and the coil L1 form a matching network in order to match the output impedance of the integrated circuit IC to the input impedance of the antenna. The transistor T, which is constructed as a common-emitter circuit, amplifies a modulated signal applied to its base and outputs it at the collector output. The RF signal thus amplified is emitted via the antenna. The coil L2 and the capacitor C4 attenuate RF signal components and prevent leakage to the supply potential. Direct-voltage signals, in contrast, are attenuated less by the coil L2 operating as a choke.

In the text which follows, use of the term of a voltage at the output A' means the difference between the potential at output A' and the ground potential.

If an RF signal is present as input signal at the base of the transistor T and the amplified signal can be picked up at the emitter, the diode D operates as rectifier and generates a rectified voltage at the output A'. This is due to the fact that the diode D suppresses the negative half-wave of the amplified RF signal whereas it passes the positive half-wave. Thus, the positive half-wave of the amplified RF signal minus the forward voltage for the corresponding diode is in each case present at the output A'. To this half-wave, the direct-voltage component of the supply voltage VC is added so that the total voltage which can be picked up at the output A' is the result of the sum of the supply voltage VC and the voltage of the half-waves, neglecting the forward voltage of the diode D.

Although the amplitude of the total voltage at the output A' is time-dependent due to the diode rectification, it is characterized by a root mean square value. To ensure that a circuit S connected to the output A' operates correctly, the root mean square value should, therefore, be of exactly the same magnitude as the supply voltage needed for the circuit S.

The capacitor C1 smoothes the rectified voltage and serves as charge store, at the same time. As a result, it is possible to still supply the circuit S with an adequate voltage for a short time even when the transistor T is not amplifying any signal. If the RF gain of the transistor T is very large, the amplitude of a half-wave of the amplified RF signal is distinctly greater than the supply voltage VC. A rectified voltage at the output A' is thus also distinctly greater and no additional addition of the supply voltage VC is necessary.

In this embodiment, the output stage transistor T and the rectifying diode D are part of an integrated chip IC. This integrated chip forms the amplifying device for the signal to be transmitted. If no circuit S, i.e. no resistive load, is connected to the output A', the amplifier IC operates normally and the diode D has no effects on the RF signal at the output A. If the output A' is connected to a resistance, the RF power drops somewhat at the output A since the diode D converts a part of the RF energy into a rectified voltage and the load at the output A' consumes power. The lower the resistance of the circuit S at the output A', i.e. the more current flows through the diode, the greater this power loss will be.

Such an integrated amplifier IC can be implemented in an extremely space-saving and inexpensive manner in already existing designs. In addition, the invention can be implemented not only by means of bipolar transistors but also in MOS circuit technology. In this case, the diode D is connected to the drain terminal of the MOS transistor. The RF signal to be amplified is fed in via the gate contact of the MOS transistor. Here, too, an integrated design is conceivable.

Figure 2:
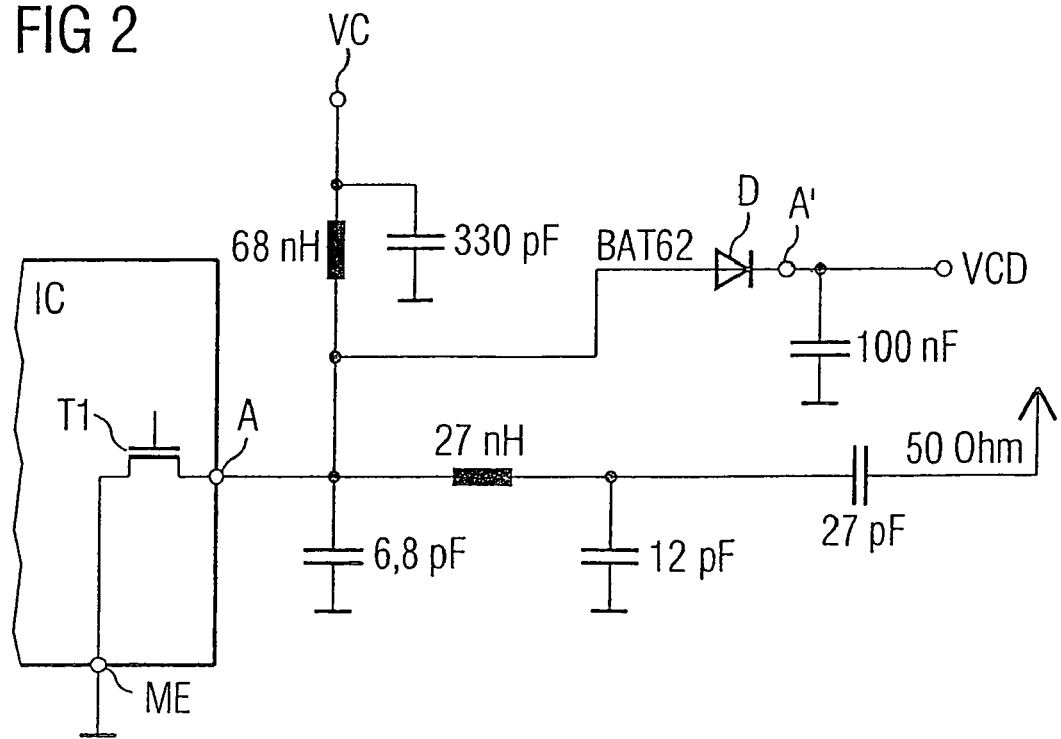
FIG. 2 shows a second exemplary embodiment.

FIG. 2 shows an actual exemplary embodiment with an MOS transistor. The difference between the embodiment of FIG. 2 and the embodiment in FIG. 1 is also that the diode D is not a component of the integrated chip IC but is coupled to the output A. The circuit of FIG. 2 was implemented with the values specified and generates at its output A' a second supply voltage VCD which is dependent on the supply voltage VC and the amplified RF signal.

Figure 3:
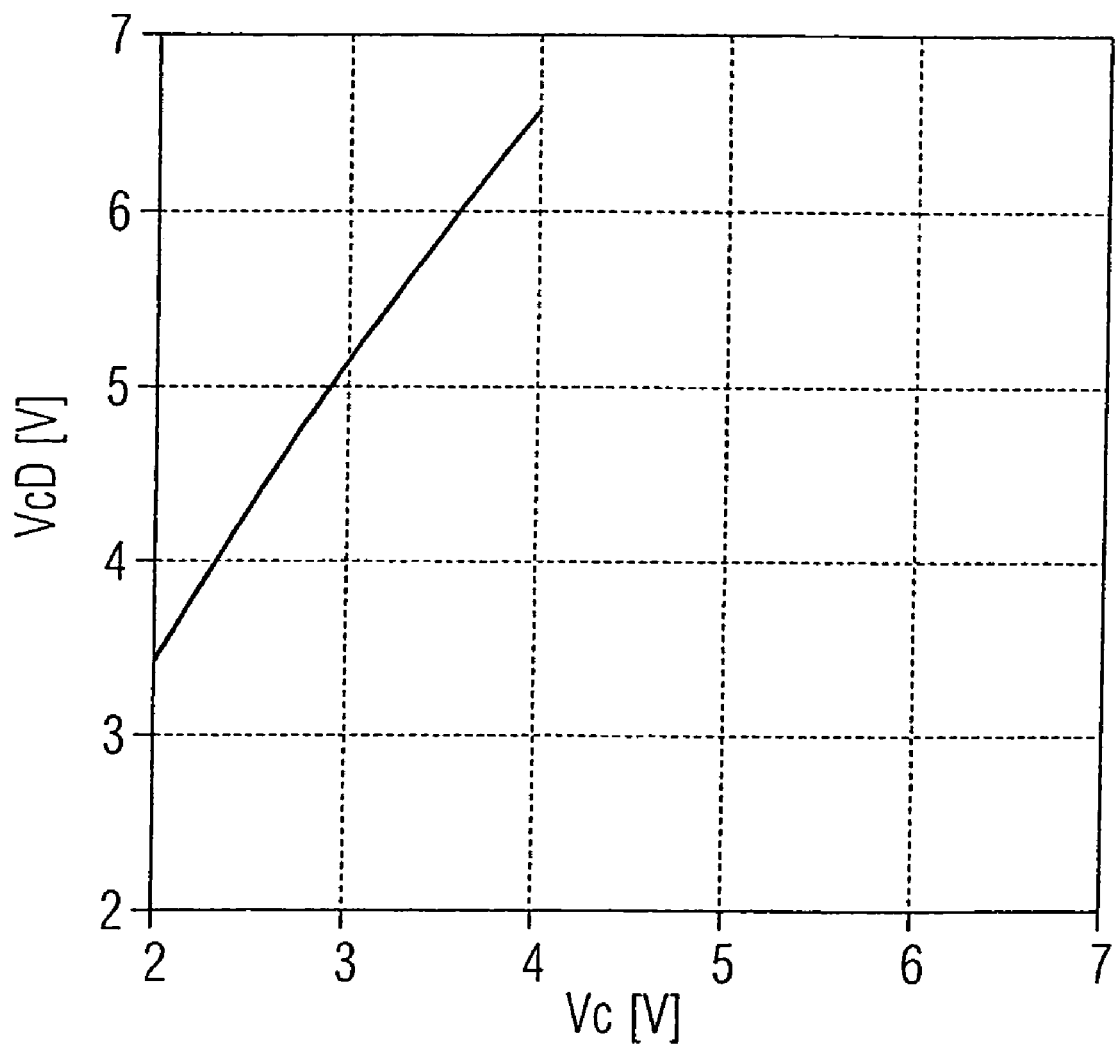
FIG. 3 shows a diagram which indicates the relationship between the second supply voltage and the first supply voltage.

The relationship between the generated second root mean-square supply voltage VCD of FIG. 1 and the supply voltage VC can be seen in FIG. 3. In this arrangement, a sinusoidal signal is applied to the base of the transistor T and amplified. The voltage VCD is measured under no load, that is to say with no connected resistance. The signal is picked up at the output A' and the voltage VCD is a result of the difference of the potential there and the ground potential.

During this no-load run, no losses are generated, i.e. the RF output power at the output A is of the same order of magnitude as without diode applied at the collector. As can be seen in the diagram, the output voltage at the output A' is 1.6 to 1.7 times the supply voltage.

If, with a supply voltage VC of 3 volts, the output of the circuit A' is loaded with a resistance of 4.7 kilohms, the output power of the antenna is reduced by less than 0.5 dB in this embodiment. At the same time, the voltage VCD drops from 5.3 volts to approx. 4.2 volts. The load current through this resistance is approx. 0.9 mA. Thus, the output A' can be connected to a circuit with a high input impedance which is supplied with a greater voltage than the first supply voltage VC without the output power of the antenna decreasing noticeably. The higher the RF gain of the transistor T at the supply voltage VC, the greater will be the second voltage VCD which can be picked up at the output A'.

Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A voltage boost circuit for increasing a supply voltage, comprising:
   a transmitter configured to transmit a signal, the transmitter comprising an amplifying device including a supply input terminal configured to couple to a first supply potential, a reference potential input terminal configured to couple to a reference potential, a signal input terminal configured to couple to an input signal, and a signal output terminal;
   an antenna coupled to the signal output terminal of the amplifying device;
   a circuit arrangement having a supply input node and an output terminal not connected to the supply input node, wherein the output terminal of the circuit arrangement is coupled to the signal input terminal of the amplifying device, and wherein the circuit arrangement is configured to receive a second supply potential at the supply input node that is greater than the first supply potential; and
   a voltage rectification circuit having an input and an output, wherein the voltage rectification circuit input is coupled to the signal output terminal of the amplifying device, and the voltage rectification circuit output is coupled to the supply input node of the circuit arrangement.

2. The voltage boost circuit as claimed in claim 1, wherein the amplifying device comprises a bipolar transistor having an emitter terminal connected to the reference potential input terminal, and a collector terminal coupled to the antenna, and to the first supply potential, and to the voltage rectification circuit.

3. The voltage boost circuit as claimed in claim 1, wherein the amplifying device comprises an MOS field effect transistor having a source terminal connected to the reference potential input terminal, and a drain terminal coupled to the antenna, and to the first supply potential, and to the voltage rectification circuit.

4. The voltage boost circuit as claimed in claim 1, wherein the amplifying device is configured to operate in a non-linear operating mode.

5. The voltage boost circuit as claimed in claim 1, wherein the voltage rectification circuit comprises at least one diode and a charge store, wherein a terminal of the charge store is coupled to an output of the voltage rectification circuit, and another terminal is coupled to the reference potential.

6. The voltage boost circuit as claimed in claim 5, wherein the charge store comprises a rechargeable battery.

7. The voltage boost circuit as claimed in claim 1, wherein the antenna and the signal output terminal of the amplifying device are coupled via a matching network.

8. The voltage boost circuit as claimed in claim 1, wherein the voltage rectification circuit comprises at least one diode, wherein the at least one diode and the amplifying device are formed within an integrated chip.

9. The voltage boost circuit as claimed in claim 1, wherein the circuit arrangement is configured to generate information, and comprises an output at which signals associated with the generated information are coupled to the signal input terminal of the amplifying device.

10. The voltage boost circuit as claimed in claim 1, wherein the circuit arrangement comprises a sensor operable to provide measured values as signals at an output thereof, wherein the sensor output is coupled to the signal input terminal of the amplifying device.

11. The voltage boost circuit of claim 1, wherein the voltage rectification circuit is further configured to add a value associated with a signal at the output terminal of the amplifying device to the first supply potential to generate the second supply potential.

12. A voltage supply circuit, comprising:
- a transmitter configured to transmit an RF signal, the transmitter comprising an amplifying circuit configured to receive an RF input signal and provide an amplifier RF output signal at an output thereof, wherein the amplifying device is further configured to receive a first supply potential and add the first supply potential to the amplified RF output signal;
- a voltage rectification circuit coupled to the output of the amplifying device, and configured to receive a time-varying signal comprising a sum of the first supply potential and the amplified RF output signal and rectify the time-varying signal, wherein the rectified time-varying signal comprises a second supply potential greater than the first supply potential; and
- a circuit arrangement operably associated with the transmitter, wherein the circuit arrangement receives and employs the second supply potential as a supply voltage.

13. The voltage supply circuit of claim 12, further comprising an antenna coupled to the output of the amplifying circuit of the transmitter and operable to transmit the received amplified RF output signal.

14. The voltage supply circuit of claim 13, further comprising a matching network coupled between the output of the amplifying device and the antenna.

15. The voltage supply circuit of claim 12, wherein the voltage rectification circuit comprises a diode configured to operate as a half-wave rectifier.

16. The voltage supply circuit of claim 15, wherein the voltage rectification circuit further comprises a charge store coupled to the diode and operable to smooth the rectified time-varying signal.

\* \* \* \* \*